(12) United States Patent
Cheng et al.

(10) Patent No.: US 8,136,168 B2
(45) Date of Patent: Mar. 13, 2012

(54) SYSTEM AND METHOD FOR DESIGN-FOR-MANUFACTURABILITY DATA ENCRYPTION

(75) Inventors: Yi-Kan Cheng, Taipei (TW); Gwan Sin Chang, Hsinchu (TW); Jill Liu, Hsinchu County (TW); Hsiao-Shu Chiao, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 950 days.

(21) Appl. No.: 11/687,384

(22) Filed: Mar. 16, 2007

(65) Prior Publication Data

US 2007/0266248 A1 Nov. 15, 2007

Related U.S. Application Data

(60) Provisional application No. 60/800,526, filed on May 15, 2006.

(51) Int. Cl.
*H04L 29/06* (2006.01)
(52) U.S. Cl. .................. 726/29; 380/281; 380/282
(58) Field of Classification Search .......... 726/26–27, 726/29; 380/279–282
See application file for complete search history.

(56) References Cited

U.S. PATENT DOCUMENTS

| | | | |
|---|---|---|---|
| 5,790,664 A * | 8/1998 | Coley et al. .................. 709/203 |
| 5,847,965 A | 12/1998 | Cheng | |
| 6,077,310 A | 6/2000 | Yamamoto et al. | |
| 6,408,219 B2 | 6/2002 | Lamey, Jr. et al. | |
| 6,505,299 B1 * | 1/2003 | Zeng et al. ..................... 713/160 |
| 6,944,762 B1 * | 9/2005 | Garrison ....................... 713/160 |
| 7,363,207 B2 | 4/2008 | Kamon | |
| 2003/0046566 A1 * | 3/2003 | Holopainen .................. 713/193 |
| 2003/0056099 A1 * | 3/2003 | Asanoma et al. ............. 713/172 |
| 2003/0192013 A1 * | 10/2003 | Cote et al. ......................... 716/2 |
| 2004/0034771 A1 * | 2/2004 | Edgett et al. ................. 713/168 |
| 2005/0013438 A1 * | 1/2005 | Nicolai ......................... 380/268 |
| 2005/0044514 A1 | 2/2005 | Wu et al. | |
| 2005/0071659 A1 * | 3/2005 | Ferguson et al. ............. 713/193 |
| 2005/0132306 A1 | 6/2005 | Smith et al. | |
| 2006/0026539 A1 | 2/2006 | Tetelbaum et al. | |
| 2006/0123380 A1 | 6/2006 | Ikeuchi | |
| 2006/0190413 A1 * | 8/2006 | Harper ........................... 705/65 |
| 2007/0055892 A1 | 3/2007 | Pikus | |
| 2007/0118824 A1 * | 5/2007 | Bae et al. .......................... 716/5 |
| 2007/0201442 A1 | 8/2007 | Hekmatpour et al. | |
| 2007/0234246 A1 | 10/2007 | Sinha et al. | |
| 2007/0266356 A1 | 11/2007 | Chang et al. | |
| 2007/0266362 A1 | 11/2007 | Lai et al. | |
| 2007/0288219 A1 | 12/2007 | Zafar et al. | |

OTHER PUBLICATIONS

Menezes et al. "Handbook of applied cryptography" 1997 CRC press chapter 8 pp. 3-11.*
Lipman "DAC—Variations on a Theme", Jul. 6, 2005, tech online, http://www.techonline.com/showArticle.jhtml?articleID=192200307.*

(Continued)

*Primary Examiner* — Kambiz Zand
*Assistant Examiner* — Michael Guirguis
(74) *Attorney, Agent, or Firm* — Haynes and Boone, LLP

(57) ABSTRACT

An encryption and decryption interface for integrated circuit (IC) design with design-for-manufacturing (DFM). The interface includes a decryption module embedded in an IC design tool; an encrypted DFM data provided to an IC designer authorized for utilizing the encrypted DFM data; and a private key provided to the IC designer for decrypting the encrypted DFM data in the IC design tool.

15 Claims, 6 Drawing Sheets

OTHER PUBLICATIONS

Gay, "Advanced UNIX Programming", Sep. 20, 2000, Sams, pp. 192-205.*

Charles Ouyang et al., "An Analyticial Model of Multiple ILD Thickness Variation Induced by Interaction of Layout Pattern and CMP Process," IEEE Transactions on Semiconductor Manufacturing, Aug. 2000, 7 pages.*

Charles Ouyang et al., An Analyticial Model of Multiple ILD Thickness Variation Induced by Interaction of Layout Pattern and CMP Process, IEEE Transactions on Semiconductor Manufacturing, Aug. 2000, 7 pages.

Raghvendra, Srinivas et al., "DFM: Linking Design and Manufacturing," Proceedings of the 18$^{th}$ International Conference on VLSI Design Held Jointly with 4$^{th}$ International Conference on Embedded Systems Design, VLSID, 2005, pp. 705-708.

Tsujikawa, Hiroyuki et al., "Power-Supply Noise Reduction with Design for Manufacturability," IEICE Trans Fundamentals, vol. E88-A, No. 12, Dec. 2005, pp. 3421-3428.

Chappell, Jeff, "The Future is the FOUP—Company Business and Marketing," Electronic News, Jul. 17, 2000, 2 pages.

Chen, Kuan-Chou, et al., "Integrated Circuits Industry / Font-Opening Unified Pod Audo-Loading Structure," Knowledge Bridge, No. 22, Apr. 2002, 4 pages.

Ottesen, Craig, "Font Opening Pod (FOUP) Fire Protection: A General Overview", Inteternational Sematech, Nov. 5, 1999, 10 pages.

* cited by examiner

SYSTEM AND METHOD FOR DESIGN-FOR-MANUFACTURABILITY DATA ENCRYPTION

CROSS-REFERENCE

This application claims the benefit of U.S. Provisional Application 60/800,526 entitled "Design for Manufacturability," filed May 15, 2006, herein incorporated by reference in its entirety.

BACKGROUND

Semiconductor technologies are continually progressing to smaller feature sizes, such as 65 nanometers, 45 nanometers, and below. Integrated circuits (IC) fabrication technologies have been exploited to a limit and need more interactions between manufacturing and designing.

One such limit relates to metal thickness. Current IC design flow only considers ideal or simplified models for metal thickness substitution. The current method for signal analysis and design performance evaluation cannot reflect the variations in metal thickness that actually occur during fabrication. For example, in the current design flow, the IC design layouts have no proper way to connect to and incorporate with a chemical mechanical polishing (CMP) process. However, the variations of the metal thickness from the CMP process seriously impacts the signal wire characteristics, IC design functionality, and performance. For various environments, the same metal wire may have different thicknesses due to the CMP process, which results in variations of electrical properties of the signal wire.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

DETAILED DESCRIPTION

Figure 1:
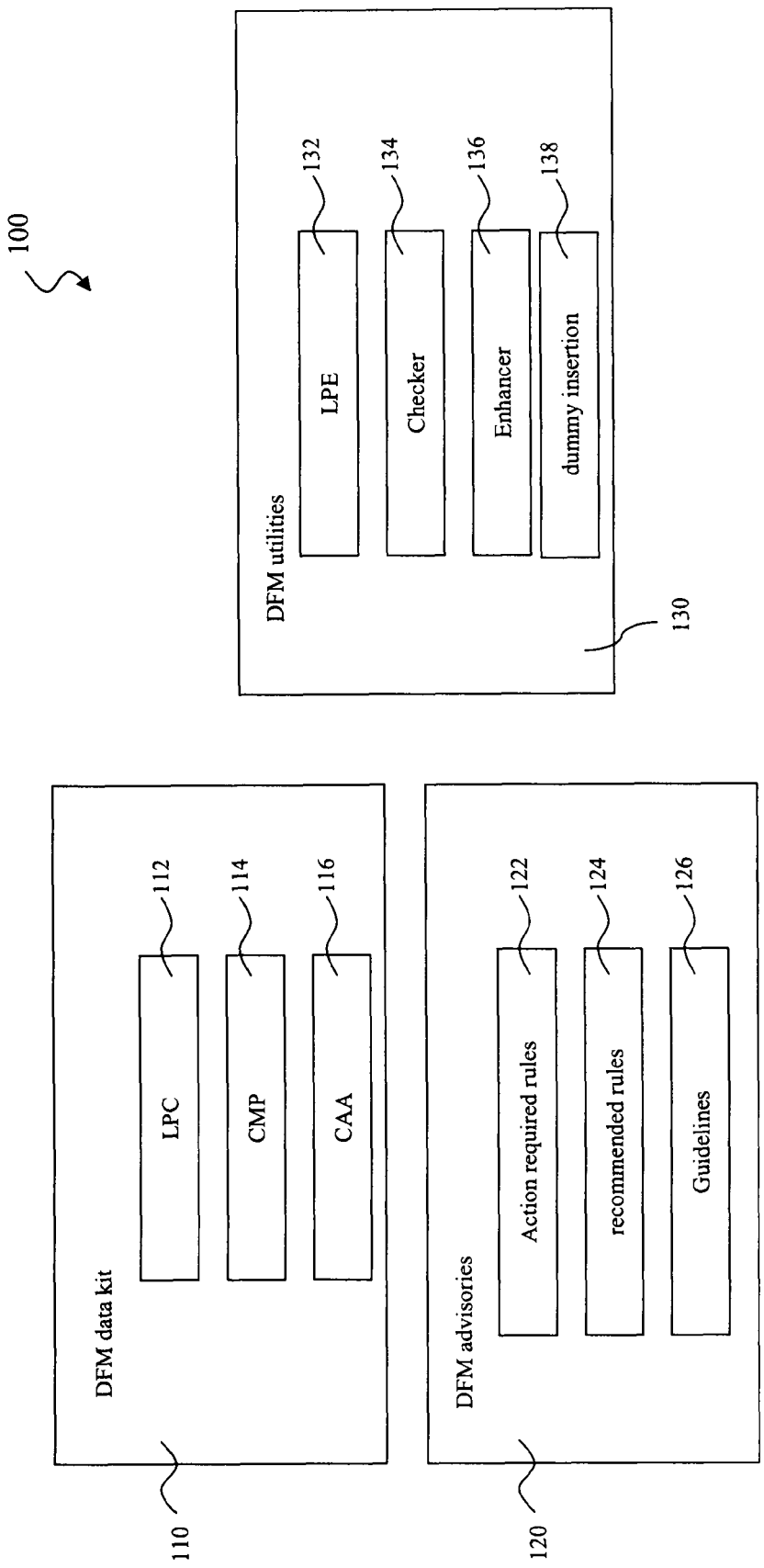
FIG. 1 is a block diagram illustrating one embodiment of a design for manufacturing (DFM) system constructed according to aspects of the present disclosure.

It is understood that the following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Design for manufacturability, or DFM, is an integration of manufacturing data and design procedure for better yield and design efficiency. An interaction and communication between designer and manufacturer is enhanced thereby for more accurate, faster, and more efficient design. In one example, various manufacturing data are formulated, quantified, and integrated to enable collaboration between manufacturer and designer, reduce design time and design cost, and increase manufacturing yield and production performance. DFM can be realized at various design stages with collaboration of design tool vendors. The manufacturer may be a semiconductor foundry. The designer may be an integrated circuit (IC) design house. The design tool vendor may be an electronic design automation (EDA) tool vendor. In some examples, a single company may include all three.

Referring to FIG. 1, an embodiment of a DFM tool kit 100 in a block diagram may include one or more various modules. In the present embodiment, the DFM tool kit 100 includes a DFM data kit (DDK) 110. Manufacturing data, such as processing recipes, tool characterization, manufacturing environment, production and processing statistical information, and IC testing and measurement data, are compiled, accumulated, and formulated to form the DDK and provide a manufacturing simulation such as lithography process check (LPC) simulation 112, chemical mechanical polishing (CMP) simulation 114, and/or critical area analysis (CAA) simulation 116. In LPC simulation 112, a lithography process can be simulated for a design layout by implementing DDK. Various failure areas, defect areas, or weak areas associated with the manufacturing process, referred to as hotspots, can be identified for further design tuning.

In the CMP simulation 114, a CMP process is simulated to a design layout by utilizing DDK 110. The design layout is converted to a material thickness and thickness hotspots can be identified for further design tweaking and tuning. CAA simulation 116 utilizes DDK for critical area identification and design improvement. DFM data may be packed in a unified format, referred to as DFM unified format (DUF). DDK 110 can be provided to an IC design vendor and be integrated into a design tool, or directly distributed to a designer such as a fab-less design house and employed by the designer in a design tool.

DFM tool kit 100 also includes DFM advisories 120. The DFM advisories 120 are extracted from the manufacturing information and provided for an IC design tool and/or a designer. The DFM advisories 120 further include DFM rules that can be incorporated into a design tool for checking any violation. DFM rules such as action required rules 122 are binding, requiring further actions to eliminate the associated violation. Recommended rules 124 are not binding and suggested for design improvement. The DFM advisories also include guidelines 146, provided for the designer to follow in implementing an IC design procedure.

DFM tool kit 100 also includes DFM utilities 130, utilizing DDK 110 and DFM advisories 120 in IC design. DFM utilities 130 may be integrated into a design tool and incorporated into a design flow. For example, dummy insertion may be implemented at the place-and-route design stage so that dummy features are automatically generated in the IC layout to reduce CMP manufacturing variances. DFM utilities 130 may provide corrective actions and solutions to the designer to guide for design improvement and tuning. For example, DFM utilities 130 may provide a solution to eliminate identified hotspots from a lithography process simulation, such as reconfiguring metal lines to eliminate the hotspots. In one embodiment, DFM utilities 130 include a layout parasitic extraction (LPE) deck 132 for extracting more accurate parasitic parameters such as parasitic resistance and capacitance with the manufacturing data such as CMP data, and further for providing suggested actions to adjust parasitic parameters and timing. DFM utilities 130 may also include a checker 134 that is integrated with DFM rules, is able to automatically check the layout for any DFM rule violation, and/or provides suggestions to eliminate the violation. DFM utilities 130 may include an enhancer 136 that is capable of automatically adjusting the layout to meet the DFM rules or eliminate identified hotspots. DFM utilities 130 may further include a dummy insertion module 138 to incorporate dummies (e.g., non-conducting metal features) into a design layout to eliminate CMP process variation.

DFM tool kit 100 provides model-based utilities from various simulations and rule-based utilities from DFM advisories. DFM tool kit 100 can be implemented at various designing stages and certain manufacturing stages. For example, dummy insertion may be implemented at place-and-route step such that the dummy features are included in a layout at early design stage. LPE deck may be implemented at extraction and a timing simulation. LPC may be implemented before the tape-out. Alternatively, LPC may be implemented after the tape-out. In this situation, the layout can be adjusted to eliminate hotspots identified by LPC before fabricating a mask of the layout in a mask shop.

Figure 2:
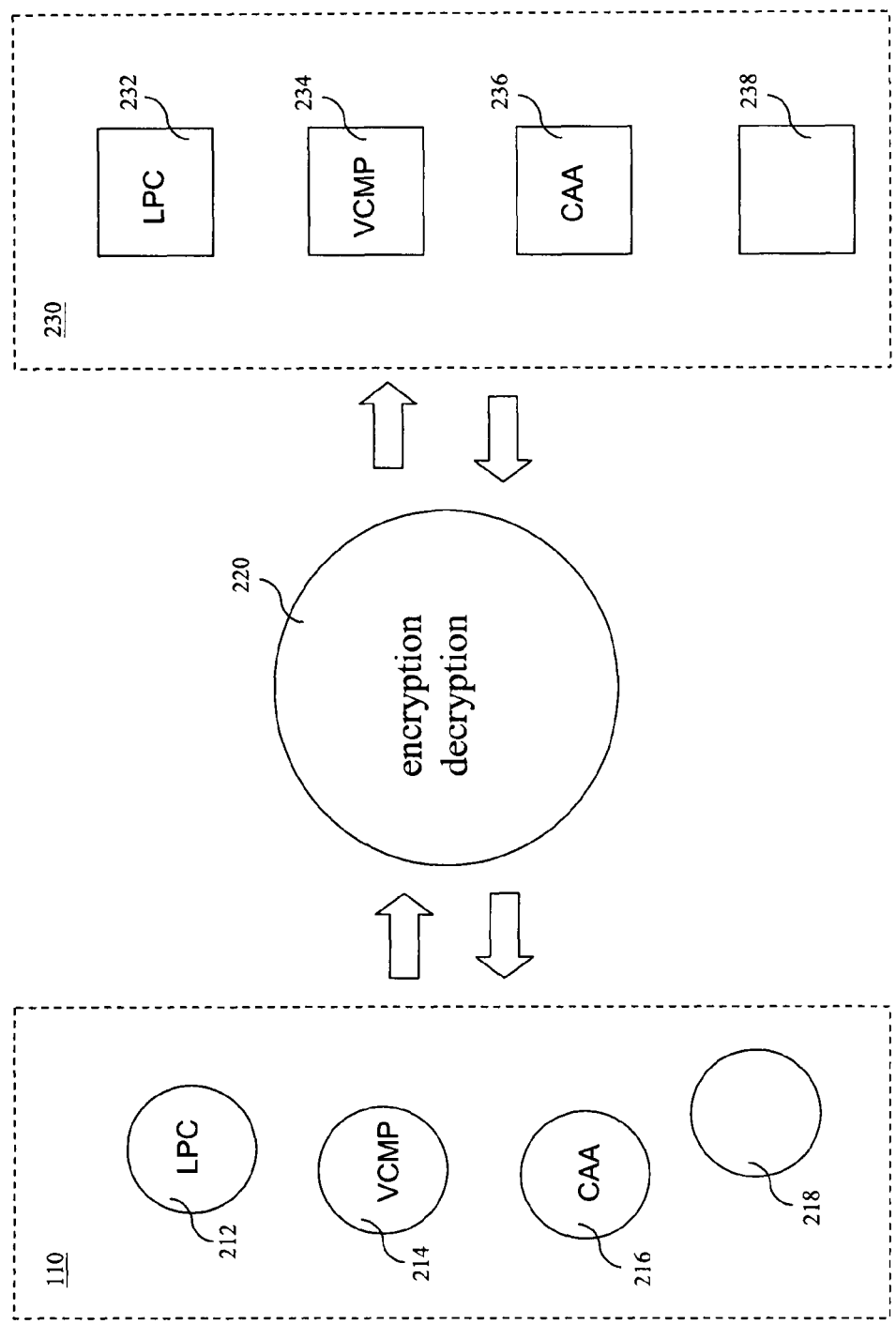
FIG. 2 is a block diagram of one embodiment of DFM data encryption/decryption flow constructed according to aspects of the present disclosure.

FIG. 2 is a block diagram of one embodiment of DFM data encryption/decryption flow constructed according to aspects of the present disclosure. A DFM data kit (DDK) 110 is substantially similar to one illustrated in FIG. 1. In one embodiment, the DDK 110 includes lithography process check (LPC) simulation 212, chemical mechanical polishing (CMP) simulation 214, and/or critical area analysis (CAA) simulation 216. The DDK 110 may further include other DFM data module 218. The DFM data in the DDK 110 are extracted from the manufacturer where the designed products are to be manufactured.

An encryption and decryption interface (EDI) 220 is provided for DFM data communication and sharing. Such encryption and decryption interface give protection to manufacturing technologies and also provides a confidential format for DFM data communications among the manufacturer, design customer (or designer), and design tool vendor. The DDK 110 with its subsets, separately or collectively, is encrypted through the EDI 220 to form an encrypted DDK 230 in which each subset is encrypted such as encrypted LPC 232, encrypted VCMP 234, encrypted CAA 236, and other encrypted DDK modules 238. The encrypted DDK 230 carries the same information of the DDK 110 but is presented differently in a way that its information is scramble and unreadable, and can only be decrypted with the authorized key. The encrypted DDK 230 can be passed to a design customer such as a design house, or can be loaded into a design tool through the design tool vendor. When an authorized designer is to implement the encrypted DDK in a design tool, the encrypted DDK 230 or its subsets are decrypted into the original DDK 110 for design tool operation with the DFM package. In one example, a private key is given to the authorized design customer for decrypting the DDK data.

Figure 3:
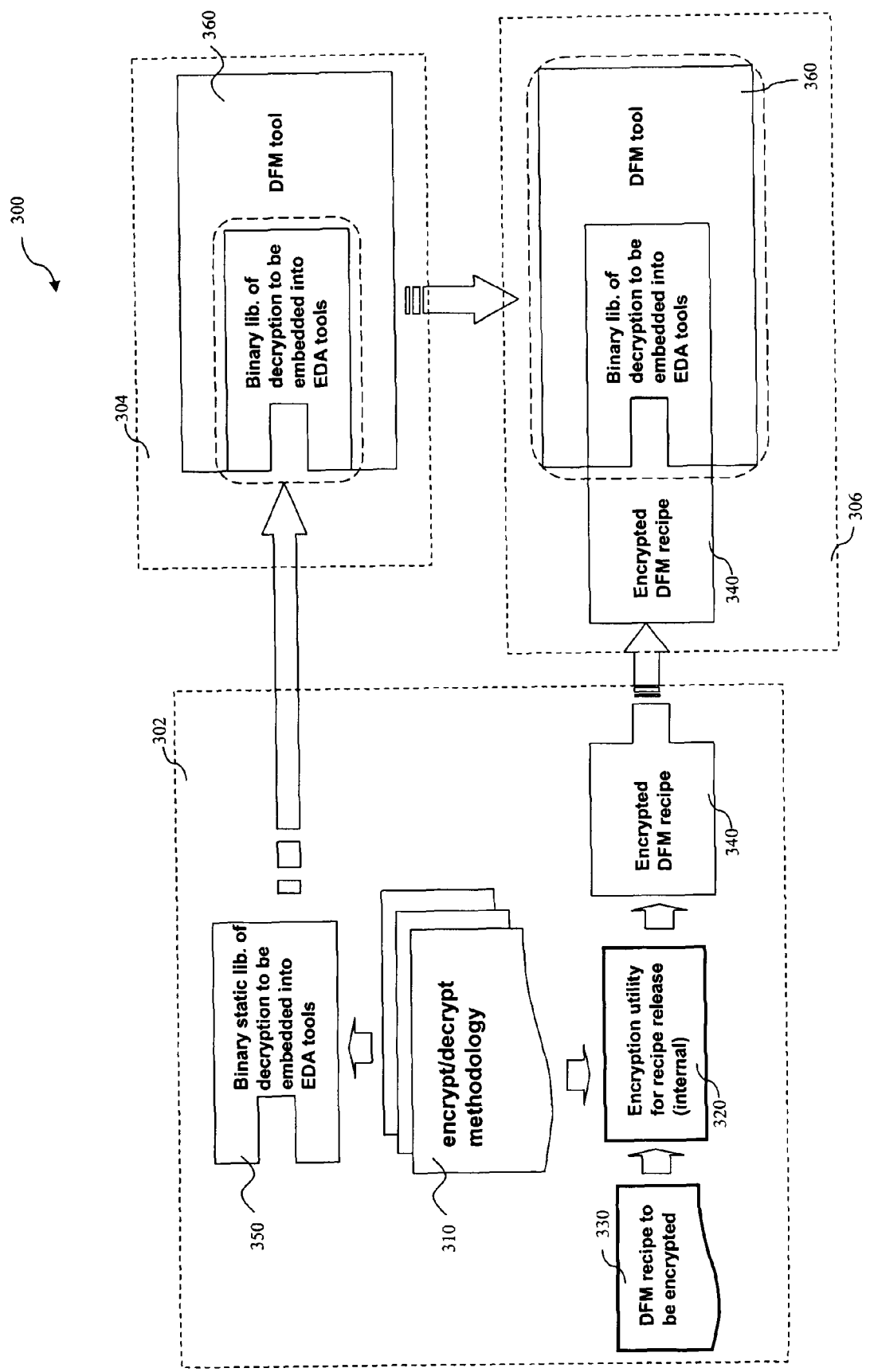
FIG. 3 is a block diagram illustrating a DFM encryption method and system and further illustrating DFM data encryption/decryption flow in one embodiment constructed according to aspects of the present disclosure.

FIG. 3 is a block diagram illustrating DFM data flow in one embodiment, and further illustrating a DFM encryption method and system. The DFM data flow is between an IC manufacturer 302 such as a semiconductor foundry, a design tool vendor 304 such as an EAD tool vendor, and a design customer 306 such as a fab-less design house. In some embodiments one or more of these entities may be part of the same company, and can even be the same entity performing different tasks (IC design, tool vending, fabrication). An encrypt/decrypt methodology 310 is developed and utilized for DFM data encryption. The utilization of the encryption/decryption methodology includes an encryption utility for a recipe release 320 for the IC manufacturer internal use. Therefore, a DFM data package 330 (or DFM recipe) such as the DDK 110 of FIG. 1 or DDK 110 of FIG. 2, or a portion thereof, is encrypted by the encryption utility 320 to form an encrypted DFM data 340 (or encrypted DFM recipe) to be released to the design customer 306. As the manufacturing data are encrypted, they are therefore protected with additional steps, methods, and modules.

The encrypt/decrypt methodology 310 also creates a library of description 350, such as a binary static library of decryption, to be delivered to the design tool vendor 304 and embedded into a DFM design tool 360, or a design tool integrated with DFM tool kit. The vendor embedded static library provides a formal interface for the design customer 306 to decrypt the encrypted DFM recipe 340. By the static library, the design tool vendor 304 provides a ready-to-decrypt tool to the design customer 306. The design customer 306 can execute the DFM tool 360 with the embedded static library 350 and the encrypted DFM recipe 340, since the DFM tool with embedded static library 350 can decrypt the encrypted DFM recipe 340 for further DFM enhanced IC designing including utilize various model-based simulations such as VCMP or LPC. The DFM tool is able to decrypt the DFM recipe 340 dynamically in one embodiment. Encryption may have various embodiments such as advanced encryption standard (AES) or NIST. The AES becomes a global standard for commercial software and hardware that use encryption or other security features. NIST is an example of an advanced encryption standard.

Figure 4:
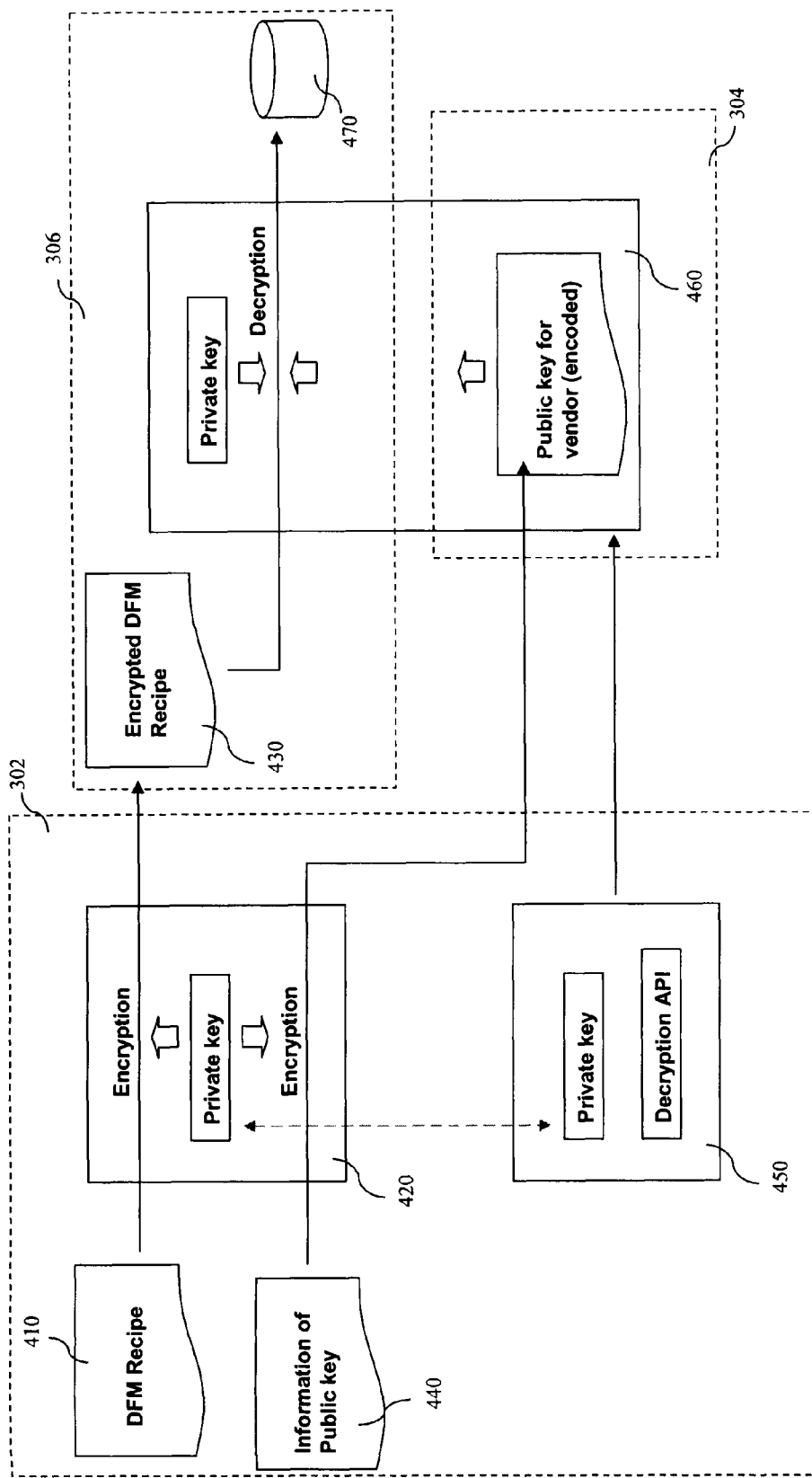
FIG. 4 is a block diagram of one embodiment of DFM data release and operation flow constructed according to aspects of the present disclosure.

FIG. 4 is a block diagram of one embodiment of a DFM data release and operation flow constructed according to aspects of the present disclosure. The DFM data release and operation flow is between the IC manufacturer 302, the design tool vendor 304, and the design customer 306. The encryption/decryption system may utilize an asymmetric cryptography with a public key for encryption and a private key for decryption. The DFM recipe 410 is encrypted by the encryption utility 420 to from an encrypted DFM recipe 430. The DFM recipe 410 includes DFM manufacturing data substantially similar to the DDK 110 of FIG. 1 and DDK 110 of FIG. 2, or is only a portion of them. The information of public key 440 is distributed to the design tool vendor 304 for encoding vendor design information. The information of public key may be further encrypted through the encryption utility 420 for safety consideration. For example, the information of public key is encrypted in the binary code. The encryption release and operation flow also utilizes a static library 450 having a decryption application program interface (API) operable for decrypting with the private key. The static library and the private key are synchronized through version control.

Accordingly, the static library's available time for the design customer is manageable by version control and customer renewal for the new version. The static library 450 is distributed to the design tool vendor 304 to form an embedded static library 460 in a design tool. The private key is provided to the authorized design customer 306. The private key may be further encrypted through the encryption utility 420 for safety consideration. For example, the information of public key is encrypted in the binary code. The authorized design customer 306, with the design tool, the embedded static library, and the provided private key, ca decrypt the encrypted DFM recipe 430 to recover the DFM recipe, which will be saved to a DFM database 470 for tool operation. The design tool will check the static library version and expiration date and further check similar information of the private key to enable or disenable the decryption.

Figure 5:
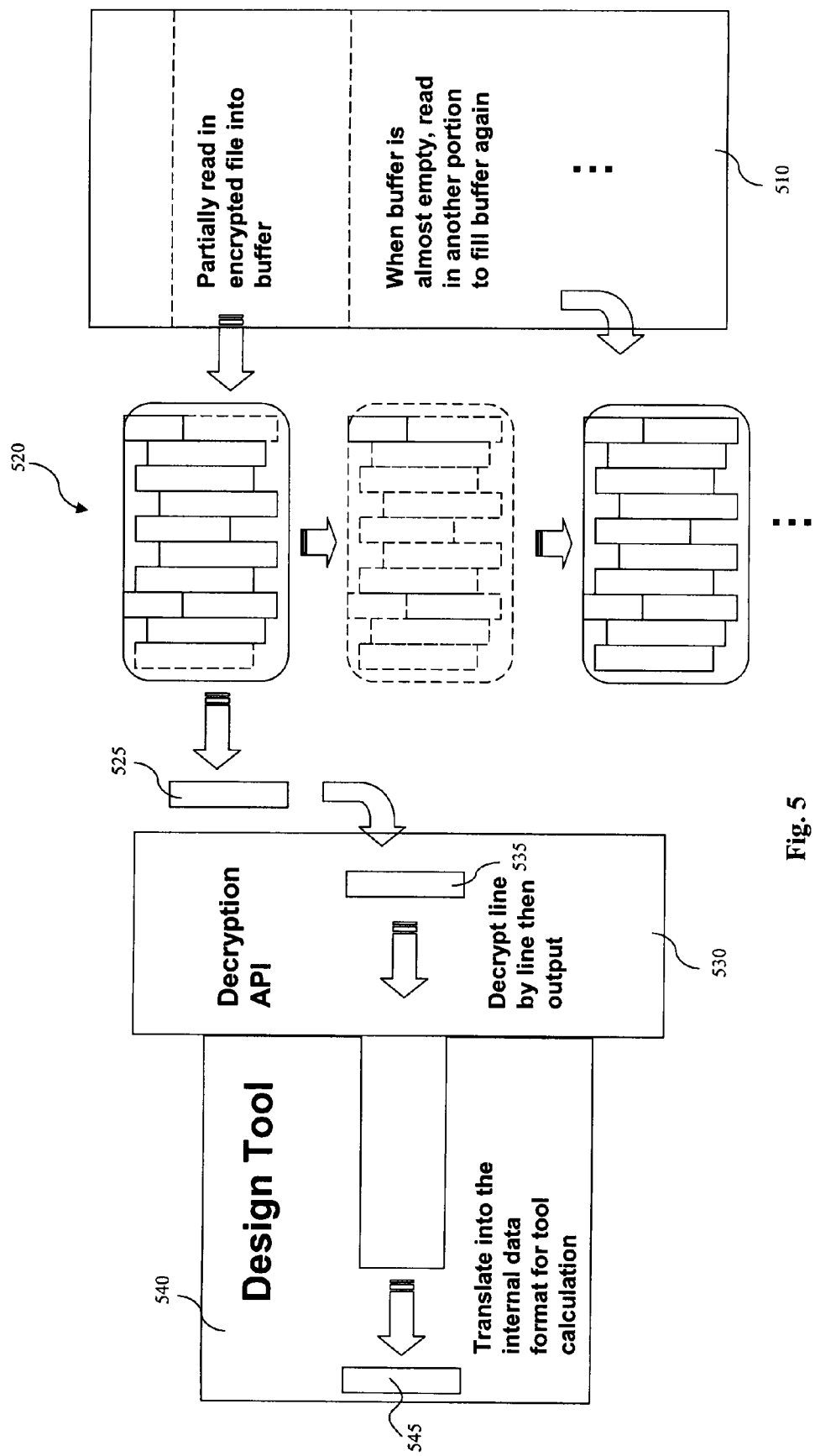
FIG. 5 is a block diagram illustrating a decryption application program interface (API) with buffered decryption function in one embodiment constructed according to aspects of the present disclosure.

FIG. 5 is a block diagram illustrating a decryption API with buffered decryption function in one embodiment constructed according to aspects of the present disclosure. An encrypted DFM data file 510 such as an encrypted DFM recipe are fed into a decryption buffer 520. The decryption buffer 520 may be able to take a portion of the encrypted DFM data file, when the decryption buffer 520 is almost empty, another portion of the encrypted DFM data file is read in to fill the decryption 520 buffer again.

The decryption API 530 pick up a single line, such as a single line 525, each time from the decryption buffer 520, then decrypts this line into a line of decrypted information 535, and then sends the decrypted line to the design tool 540. In this way, the decryption API 530 decrypts the encrypted DFM file line by line. The design tool 540 may further translate the encrypted line 535 into a set of data 545 presented in a different format such as an internal data format for design tool calculation. The disclosed decryption API with buffered decryption function is capable to decrypt DFM data efficiently.

Figure 6:
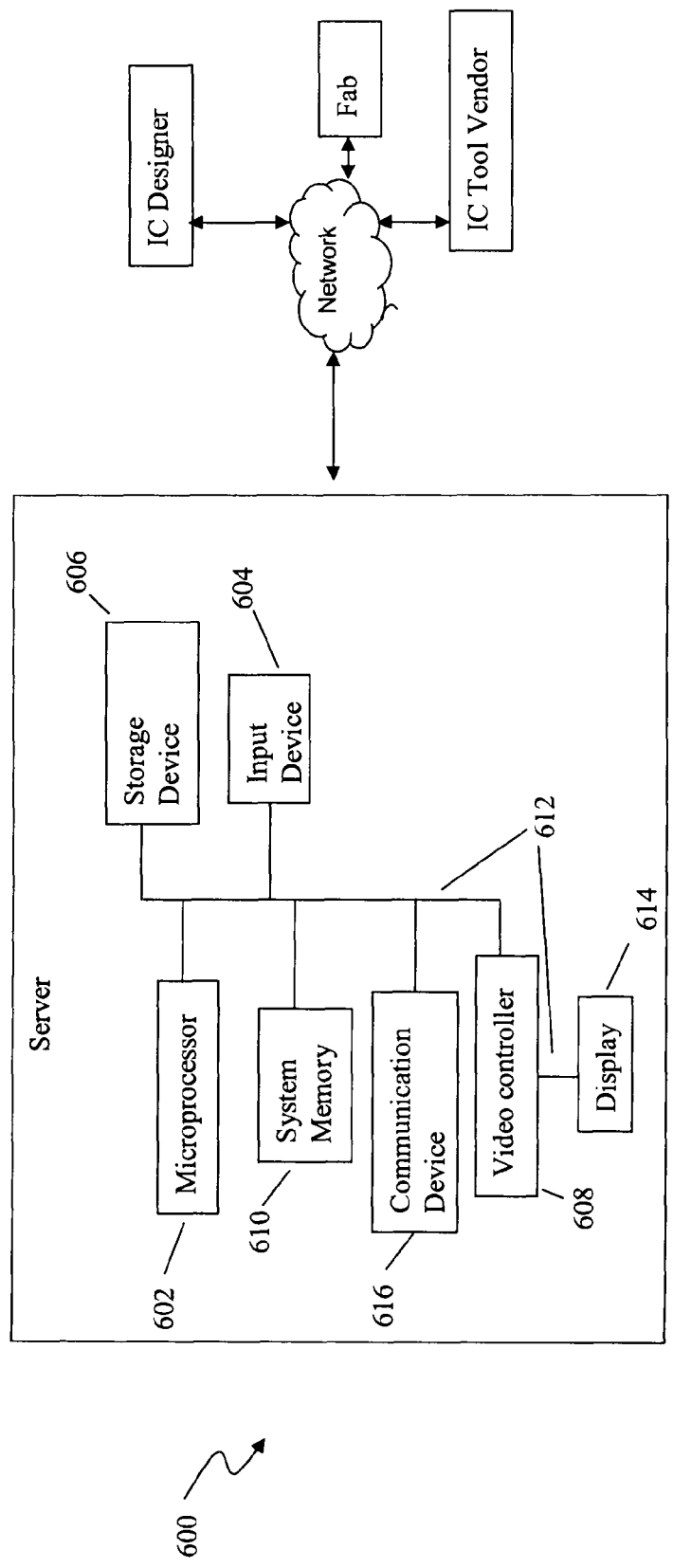
FIG. 6 is a block diagram illustrating a computer system constructed according to aspects of the present disclosure.

Referring now to FIG. 6, shown therein is an illustrative computer system 600 for implementing embodiments of the methods described above. The computer system 600 is shown as including four separate computer systems, a server, an IC design vendor, an IC designer, and a fab, connected over one or more networks. Of course this is just an example, and various configurations of more or less computer systems connected over more or less networks can alternatively be used, according to the desired embodiment configuration.

For the sake of further example, each computer system includes a microprocessor 602, an input device 604, a storage device 606, a video controller 608, a system memory 610, and a display 614, and a communication device 616 all interconnected by one or more buses 612. The storage device 606 could be a floppy drive, hard drive, CD-ROM, optical drive, or any other form of storage device. In addition, the storage device 606 may be capable of receiving a floppy disk, CD-ROM, DVD-ROM, or any other form of computer-readable medium that may contain computer-executable instructions. Further communication device 616 could be a modem, network card, or any other device to enable the computer system to communicate with other nodes. It is understood that any computer system could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip. Accordingly, it should be understood that combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the present disclosure may be embodied in the RAM of a computer to transform a standard computer into a new specific computing machine.

Data structures are defined organizations of data that may enable an embodiment of the present disclosure. For example, a data structure may provide an organization of data, or an organization of executable code. Data signals could be carried across transmission mediums and store and transport various data structures, and, thus, may be used to transport an embodiment of the present disclosure.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

The present disclosure provides various embodiments for DFM data encryption/decryption method and system. Other embodiments, extension, and alternation are possible without departing the scope of the disclosure. For example, various methodologies for key protection are utilized. In one embodiment, highest security with 256 bits encryption. In another embodiment, in order to prevent the key in binary code from leaking or tracking, further expansion, interleave, and scramble of the encrypted key information are adopted. In another embodiment, expiration date, tool features, and further items (like technology or design tool vendor name) are implicitly checked through the encrypted information carried by the public key.

In furtherance of examples, the API is capable of partially encrypting the DFM data by specifying reserved starting and ending keywords (with leading '#' sign for example). The leading character should not cause design tool any parsing issue. The API contains line-by-line output function and the parsing is implemented inside the design tool. The static library in binary format can be embedded into the design tool at compile stage. The version number is encrypted in the static library, with backward compatibility. But new encryption can only be decrypted by new version of the static library. The private key is hard coded (accumulated) in the static library for version control. Exception catching mechanism is utilized for runtime error control. The design tool has not decrypted information leaked after invoking the API.

In other examples, versions control of DFM recipes and DFM rule tables, and decryption static library are separated. DFM recipes before encryption and after decryption are compared in different ways, and/or among different platforms such as SunOS, Linux, HP, 32 bit and 64 bit. The encrypted DFM data may include DFM advisories such as action required rules integrated with a design tool; recommend rules integrated with the design tool; and guidelines provided to a designer for implementing IC design.

The present disclosure provides an encryption and decryption interface for integrated circuit (IC) design with design-for-manufacturing (DFM). The interface includes a decryption module embedded in an IC design tool; an encrypted DFM data provided to an IC designer authorized for utilizing the encrypted DFM data; and a private key provided to the IC designer for decrypting the encrypted DFM data in the IC design tool.

The disclosed interface may further include providing a public key to an IC design vendor for encoding design information into the IC design tool. The public key may be encrypted before providing the public key to the IC design vendor. The interface may further include an encryption module for an IC manufacturer to encrypt DFM data into the encrypted DFM data. The DFM data may include manufacturing data selected from the group consisting of lithography process check (LPC) data; chemical mechanical polishing (CMP) data; and critical area analyzer (CAA) data. The DFM data may include DFM advisors selected from the group consisting of action required rules integrated with a design tool; recommend rules integrated with the design tool; and guidelines provided to a designer for implementing IC design. The private key may be encrypted before it is provided to the IC designer. The decryption module may include a binary static library. The binary static library and the private key are synchronized through version control. The decryption module may include a buffered decryption function.

The present disclosure also provides an encryption and decryption method for integrated circuit (IC) design with design-for-manufacturing (DFM). The method includes embedding a decryption module in an IC design tool; encrypting DFM data to form encrypted DFM data; distributing the encrypted DFM data to an IC designer authorized to use the DFM data; and providing a private key to the IC designer for decrypting the encrypted DFM data in the IC design tool.

The disclosed method may further include providing a public key to an IC design tool vendor to encode design information to the IC design tool. Providing the public key may include encrypting the public key. Providing the private key may include encrypting the private key. The embedding of the decryption module may include embedding the decryption module in a version mode. Providing the private key may include providing the private key in a version mode. The method further includes performing DFM design on the IC design tool with DFM data after decrypting.

The present disclosure also provide another embodiment of an encryption and decryption method for integrated circuit (IC) design with design-for-manufacturing (DFM). The method includes embedding a decryption module in an IC design tool; distributing the encrypted DFM data to an IC designer using the IC design tool; and providing a private key to the IC designer for decrypting the encrypted DFM data in the IC design tool.

The disclosed method may further include providing a public key to an IC design tool vendor for encoding design information to the IC design tool. The public key may be encrypted before providing to the IC design tool vendor. Furthermore, the private key may be encrypted before the providing the private key to the IC designer. The encrypted DFM data are transformed from manufacturing data for DFM design.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An encryption and decryption system for integrated circuit (IC) design with design-for-manufacturing (DFM), comprising:
   a public key in non-transitory computer readable storage configured to be provided to an IC design tool vendor for encoding vendor design information into an IC design tool;
   a decryption module configured to be embedded in the IC design tool in non-transitory computer readable storage, wherein the decryption module includes a static library having a decryption application program interface;
   an encrypted DFM data in non-transitory computer readable storage configured to be provided to an IC designer authorized for utilizing the encrypted DFM data,
   wherein the DFM data comprises manufacturing data including lithography process check (LPC) data, chemical mechanical polishing (CMP) data, and critical area analyzer (CAA) data,
   wherein the DFM data comprises DFM advisories including action required rules integrated with a design tool, recommend rules integrated with the design tool, and guidelines provided to a designer for implementing IC design;
   a private key in non-transitory computer readable storage configured to be provided to the IC designer for decrypting the encrypted DFM data in the IC design tool, wherein the private key is synchronized with the static library through version control, and further wherein the decryption module checks a version number and an expiration date of both the static library and the private key to enable or disenable decryption of the encrypted DFM data; and DFM utilities in non-transitory computer readable storage to be integrated into the IC design tool for providing corrective actions to the IC designer utilizing decrypted manufacturing data and DFM advisories.

2. The system of claim 1, further comprising a mechanism for encrypting the private key before the private key is provided to the IC designer.

3. The system of claim 2, wherein the mechanism is configured to encrypt the public key before the public key is provided to the IC design tool vendor.

4. The system of claim 1, further comprising an encryption module for an IC manufacturer to encrypt DFM data into the encrypted DFM data.

5. The system of claim 1, wherein the decryption module comprises a binary static library.

6. The system of claim 1, wherein the decryption module comprises a decryption buffer that reads in a first portion of the encrypted DFM data, decrypts the first portion of the encrypted DFM data line by line, and subsequently reads in a second portion of the encrypted DFM data.

7. An encryption and decryption method for integrated circuit (IC) design with design-for-manufacturing (DFM), comprising:

providing a public key in computer readable storage to an IC design tool vendor for encoding vendor design information into an IC design tool;

providing a decryption module embedded in the IC design tool in computer readable storage, wherein the decryption module includes a static library having a decryption application program interface;

encrypting DFM data to form encrypted DFM data in computer readable storage using a computer,
wherein the DFM data comprises manufacturing data including lithography process check (LPC) data, chemical mechanical polishing (CMP) data, and critical area analyzer (CAA) data,
wherein the DFM data comprises DFM advisories including action required rules integrated with a design tool, recommend rules integrated with the design tool, and guidelines provided to a designer for implementing IC design;

distributing the encrypted DFM data to an IC designer authorized to use the DFM data using a communication device;

providing a private key in computer readable storage to the IC designer for decrypting the encrypted DFM data in the IC design tool, wherein the private key is synchronized with the static library through version control for checking a version number and an expiration date of both the static library and the private key to enable or disenable decryption of the encrypted DFM data; and providing corrective actions to the IC designer with DFM utilities integrated into the IC design tool utilizing decrypted manufacturing data and DFM advisories.

8. The method of claim 7, wherein providing the public key comprises encrypting the public key.

9. The method of claim 7, wherein providing the private key comprises encrypting the private key.

10. The method of claim 7, wherein embedding the decryption module comprises embedding the decryption module in a version mode.

11. The method of claim 7, further comprising:
performing DFM design on the IC design tool with DFM data after decrypting.

12. An encryption and decryption method for integrated circuit (IC) design with design-for-manufacturing (DFM), comprising:

providing a public key in computer readable storage to an IC design tool vendor for encoding vendor design information into an IC design tool;

providing a decryption module embedded in the IC design tool in computer readable storage, wherein the decryption module includes a static library having a decryption application program interface;

distributing encrypted DFM data in computer readable storage to an IC designer implementing the IC design tool using a communication device,
wherein the DFM data comprises manufacturing data including lithography process check (LPC) data, chemical mechanical polishing (CMP) data, and critical area analyzer (CAA) data,
wherein the DFM data comprises DFM advisories including action required rules integrated with a design tool, recommend rules integrated with the design tool, and guidelines provided to a designer for implementing IC design;

providing a private key in computer readable storage to the IC designer for decrypting the encrypted DFM data in the IC design tool,
wherein the private key is synchronized with the static library through version control for checking a version number and an expiration date of both the static library and the private key to enable or disenable decryption of the encrypted DFM data,
wherein decrypting the encrypted DFM data includes reading in a first portion of the encrypted DFM data, decrypting the first portion of the encrypted DFM data line by line, and subsequently reading in a second portion of the encrypted DFM data; and providing corrective actions to the IC designer with DFM utilities integrated into the IC design tool utilizing decrypted manufacturing data and DFM advisories.

13. The method of claim 12, wherein the providing the public key to the IC design tool vendor comprises encrypting the public key.

14. The method of claim 12, wherein the providing the private key to the IC designer comprises encrypting the private key.

15. The method of claim 12, wherein the encrypted DFM data are transformed from manufacturing data for DFM design.

* * * * *